(12) United States Patent
Morris et al.

(10) Patent No.: US 8,131,406 B2
(45) Date of Patent: Mar. 6, 2012

(54) PISTON ENGINE AIRCRAFT AUTOMATED PRE-FLIGHT TESTING (75) Inventors: James Paul Morris, Montoursville, PA (US); Charles Schneider, Watsontown, PA (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 1001 days.

(21) Appl. No.: 12/100,244

(22) Filed: Apr. 9, 2008

(65) Prior Publication Data

US 2009/0259350 A1  Oct. 15, 2009

(51) Int. Cl.
*G01C 23/00* (2006.01)

(52) U.S. Cl. ........... 701/3; 701/14; 701/29; 701/35; 701/36; 244/101; 244/105; 244/106; 244/218; 60/204; 60/206; 60/212; 60/219; 60/260

(58) Field of Classification Search ............. 701/3, 14, 701/36, 35, 29; 244/101, 106, 105, 218; 244/17.25; 60/204, 206, 212, 219, 260
See application file for complete search history.

(56) References Cited

U.S. PATENT DOCUMENTS

| | | | |
|---|---|---|---|
| 4,351,394 A | 9/1982 | Enk | |
| 4,849,893 A | 7/1989 | Page et al. | |
| 4,943,919 A | 7/1990 | Aslin et al. | |
| 5,023,791 A | 6/1991 | Herzberg et al. | |
| 5,483,833 A | 1/1996 | Dickens et al. | |
| 5,544,842 A | 8/1996 | Smith et al. | |
| 5,605,135 A | 2/1997 | Netherwood | |
| 5,787,372 A * | 7/1998 | Edwards et al. | 701/29 |
| 5,938,401 A * | 8/1999 | Modeen et al. | 415/36 |
| 6,751,536 B1 | 6/2004 | Kipersztok et al. | |
| 6,941,204 B2 | 9/2005 | Halm et al. | |
| 7,050,894 B2 | 5/2006 | Halm et al. | |
| 7,168,236 B2 * | 1/2007 | Schmotolocha et al. | 60/204 |
| 7,209,814 B2 | 4/2007 | Kipersztok et al. | |
| 7,512,463 B1 * | 3/2009 | Bechhoefer | 701/3 |
| 7,693,624 B2 * | 4/2010 | Duggan et al. | 701/24 |
| 2004/0088991 A1 | 5/2004 | Gallant et al. | |
| 2004/0111197 A1 | 6/2004 | Kipersztok et al. | |
| 2007/0142980 A1 * | 6/2007 | Ausman et al. | 701/3 |

* cited by examiner

*Primary Examiner* — Thomas Black
*Assistant Examiner* — Luke Huynh
(74) *Attorney, Agent, or Firm* — BainwoodHuang (57) ABSTRACT

One embodiment is directed to a method for testing an aircraft prior to flight. The method includes receiving a user signal from a pre-flight test input source, the user signal indicating that a pilot of the aircraft has directed engine control circuitry, which is arranged to electronically control operation of a set of piston engines of the aircraft during flight, to begin testing the aircraft in an automated manner. The method includes, in response to the user signal, conducting a pre-flight test of the aircraft from the engine control circuitry. The method includes, upon completion of the pre-flight test, outputting a result of the pre-flight test from the engine control circuitry.

20 Claims, 5 Drawing Sheets

ECU Data Structures 66

Condition Field 70(A)
(E,G., Throttle Position Learning = "Good")

Condition Field 70(B)
(E,G., Check Spark Plugs = "Good")

Condition Field 70(C)
(E,G., Fuel Sweep = "Good")

Condition Field 70(D)
(E,G., Wastegate Control Valve = "Bad")

Condition Field 70(E)
(E,G., Prop Pitch Check = "Good")

PISTON ENGINE AIRCRAFT AUTOMATED PRE-FLIGHT TESTING

BACKGROUND

A typical piston engine airplane includes one or more piston engines which propel the airplane. Each engine draws a mixture of fuel and air through a carburetor, and receives timed sparks from a distributor. As a result, combustion in that engine drives a propeller and perhaps additional devices (e.g., an electric generator, an oil pump, a fuel pump, etc.).

Prior to takeoff, the pilot of the piston engine airplane typically reviews a checklist of pre-flight checks that the pilot must make before being able to safely take off. In general, each check involves the pilot performing an extensive detailed inspection of an operable component of the airplane.

One conventional pre-flight checklist requires the pilot to manually adjust certain piston engine controls, and verify that the piston engines of the airplane respond to these manual adjustments. For example, one checklist item may require the pilot to manually change the fuel/air mixture and listen for a corresponding change in the RPMs of the piston engines. Another checklist item may require the pilot to manually change the oil pressure to an adjustable propeller, and sense whether the angular pitch of the adjustable propeller has changed (e.g., airplane may pull more or less depending on the pitch of the adjustable propeller).

SUMMARY

Unfortunately, there are drawbacks to simply carrying out the above-described conventional pre-flight checklist. In particular, utilization of a pre-flight checklist is intensively manual and thus prone to inconsistency, subjectivity and human error. The pilot may misread certain gauges or accidentally skip certain checks. The checklist is extremely burdensome for the pilot to carry out. The pilot may even superficially perform (or perhaps even skip) a portion of the checklist if the pilot has recently landed the aircraft or has other foolhardy reasons to believe the aircraft is already operating properly. Even if the pilot carries out the pre-flight checklist comprehensively, there is no formal system in place to accurately store the results of carrying out the pre-flight checks. Some pilots may fill out a form on a clip board or write results in a notebook for later analysis review. However, since there is no formal system in place some pilots may not record these results at all or record the results in a manner that is illegible or otherwise unusable to others. This could pose a threat to detecting the origin of a failure after it has occurred.

In contrast to the above-described conventional approach to going through a pre-flight checklist prior to take off, an improved technique for testing an aircraft prior to flight involves engine control circuitry conducting a pre-flight test in an automated manner. Such a technique is capable of removing the burden of performing a pre-flight checklist from the pilot. Accordingly, human error would effectively be removed from the pre-flight routines, to ensure that gauges are not misread and that the engine functions are verified to be in working order. Furthermore, automation of the pre-flight test removes the possibility of inadvertently skipping or overlooking a particular test. Additionally, the results of this test can be easily automatically stored electronically. This provides interested parties with a robust history of a piston engine aircraft's status prior to flights.

One embodiment is directed to a method for testing an aircraft prior to flight. The method includes receiving a user signal from a pre-flight test input source, the user signal indicating that a pilot of the aircraft has directed engine control circuitry, which is arranged to electronically control operation of a set of piston engines of the aircraft during flight, to begin testing the aircraft in an automated manner. The method further includes, in response to the user signal, conducting a pre-flight test of the aircraft from the engine control circuitry. The method further includes, upon completion of the pre-flight test, outputting a result of the pre-flight test from the engine control circuitry.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for testing an aircraft prior to flight involves directing the electronic control circuitry of a piston engine aircraft to conduct pre-flight testing in an automated and consistent manner. Accordingly, the automated pre-flight test provides reliable and objective testing without the need for a conventional, cumbersome, and error susceptible pre-flight checklist.

Figure 1:
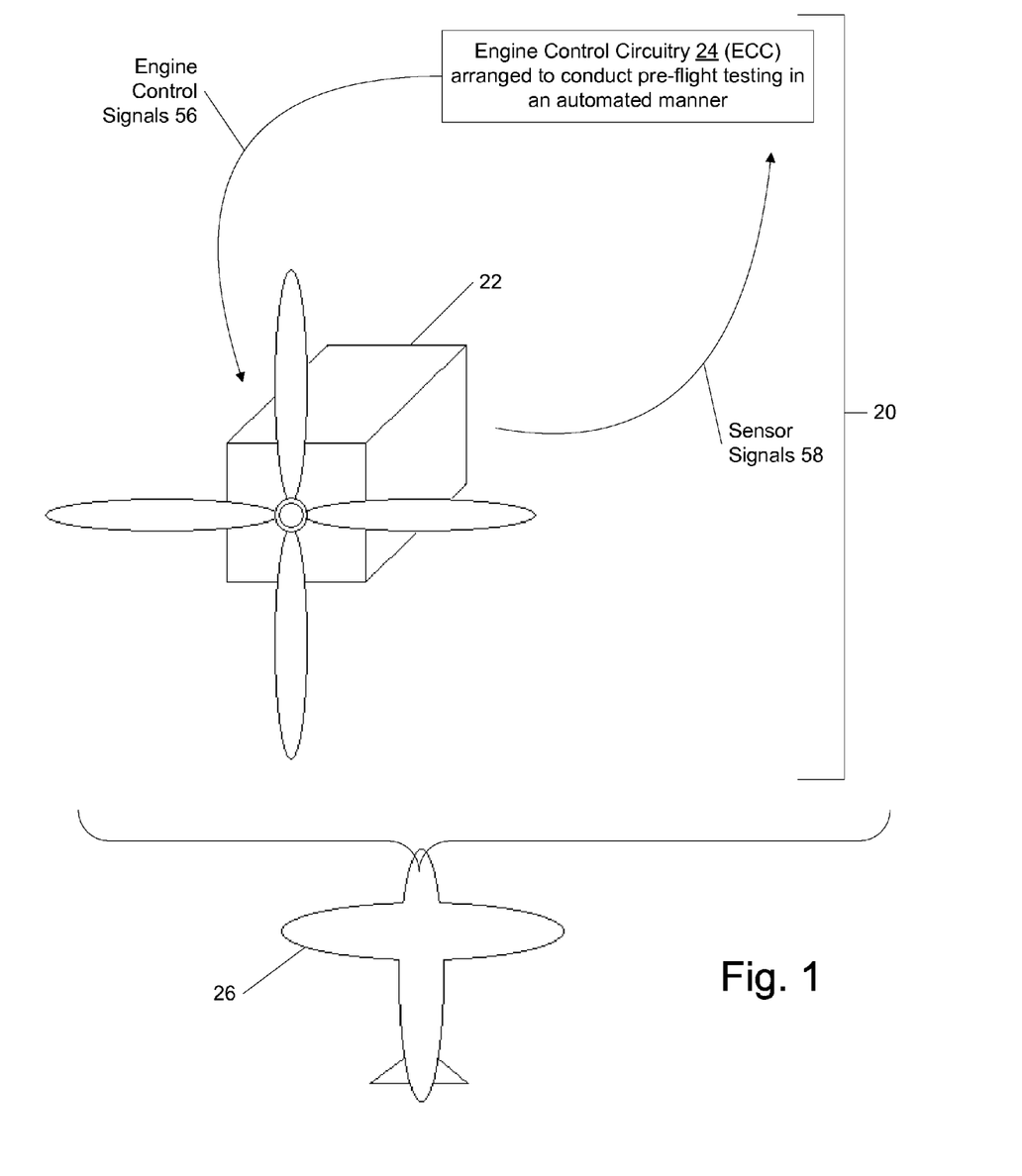
FIG. 1 is a perspective view of an electrical aircraft control system having a piston engine, and engine control circuitry that is disposed in a piston engine aircraft.

FIG. 1 shows an electronic aircraft control system 20 which includes a piston engine 22, and engine control circuitry 24. The electronic aircraft control system 20 resides within a piston engine aircraft environment 26.

The engine control circuitry 24 is arranged to carry out a variety of operations. In particular, the engine control circuitry 24 is arranged to control engine combustion (e.g., provides timed spark plug signals to the spark plugs of the engine 22, provides fuel metering signals to the fuel injectors of the engine 22, etc.). Additionally, the engine control circuitry 24 is arranged to perform pre-flight testing prior to takeoff.

Figure 2:
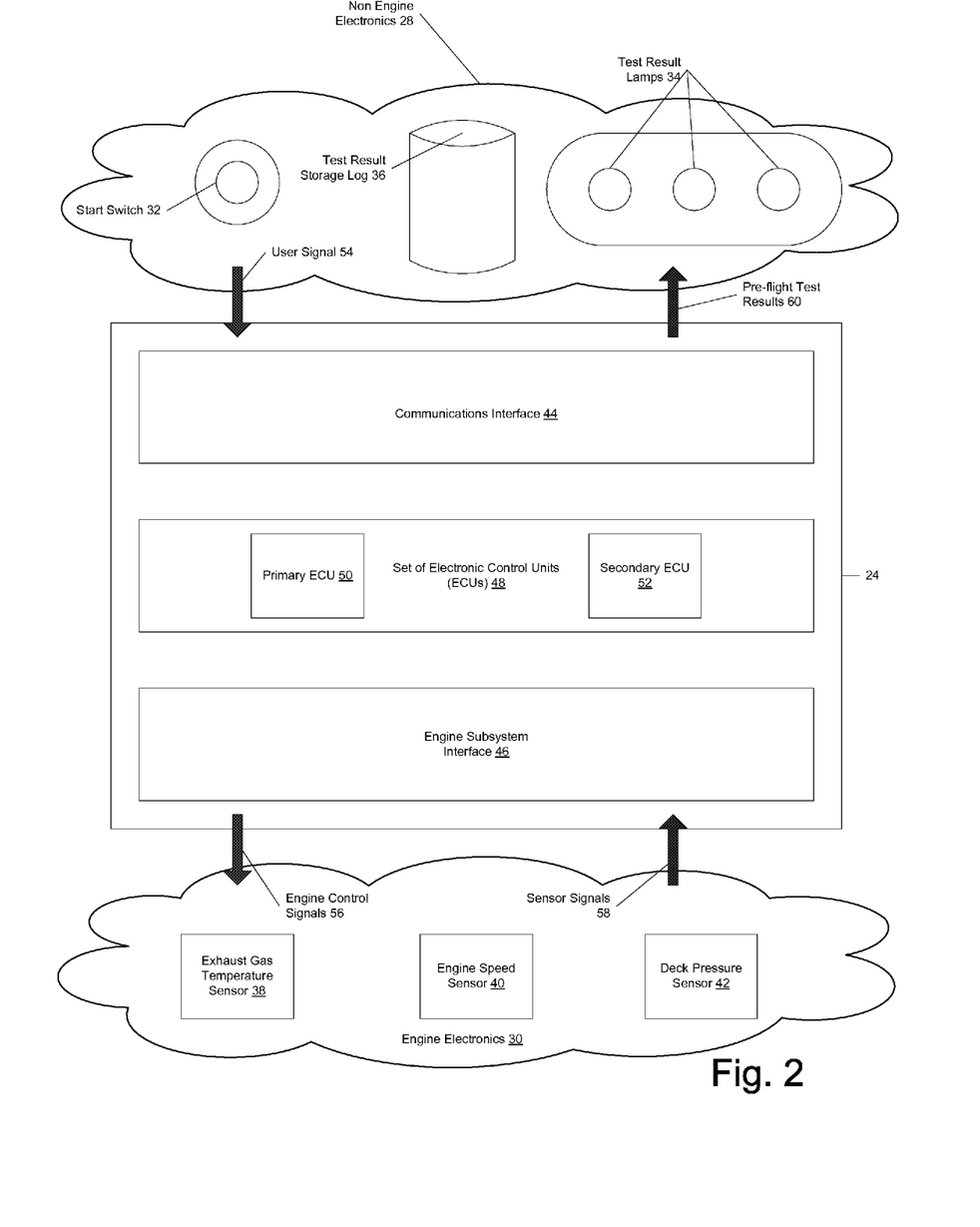
FIG. 2 is a diagram of the engine control circuitry as it interacts with various parts of the piston engine aircraft including non-engine electronics and engine electronics.

FIG. 2 shows the engine control circuitry 24 as it interacts with various components of the piston engine aircraft 26. Examples of such components are non-engine electronics 28 and engine electronics 30. Example non-engine electronics 28 are a start switch 32, a set of test result lamps 34 (i.e., one or more test result lamps 34), a test result storage log 36, and other ancillary circuitry which does not directly access the engine 22. Example engine electronics 30 include an exhaust gas temperature sensor 38, an engine speed sensor 40 (e.g., a crank position sensor), and a deck pressure sensor 42. The engine control circuitry 24 includes a communications interface 44, an engine subsystem interface 46 and a set of electronic control units 48. The set of electronic control units 48 contains a primary electronic control unit 50 and a secondary electronic control unit 52.

The primary electronic control unit 50 and the secondary electronic control unit 52 provide fault tolerance. The primary electronic control unit 50 is a computerized device that interacts with a user and directs certain operations of the engine 22 by controlling the electronic control circuitry 24. For example, these operations include using electronic fuel injectors to deliver fuel to the engine 22, and controlling spark plugs to ignite the fuel. Maintenance of engine 22 operations in piston engine aircrafts 26 is of critical importance at all times during flight. For example, the loss of combustion control during flight would be catastrophic. Nevertheless, the possibility exists that the primary electronic control unit 50, which controls engine combustion during a normal flight mode may fail. In such a situation, the secondary electronic control unit 52 is configured to do the same operations performed by the primary electronic control unit 50. That is, the secondary electronic control unit 52 automatically takes over control of the electronic control circuitry 24 in a backup flight mode if the primary electronic control unit 50 fails.

The pre-flight test is an automated test used to validate that both the primary electronic control unit 50 and the secondary electronic control unit 52 are operating properly and to assure a seamless handoff of engine 22 control can be accomplished between channels prior to take-off of the aircraft (e.g., the pre-flight test is repeated by both ECU channels). In addition to validating that the set of electronic control units 48 are in working order, the pre-flight test also goes through additional tests (e.g., throttle position learning, spark plug checks, etc.) to ensure the aircraft 22 is prepared for take off. At least some of these tests involve changing the aircraft's control scheme and/or device settings (e.g., throttle position, waste gate position, etc.). After the pre-flight test is completed, any changes made to the aircraft's 26 control scheme or device settings is returned to the same as they were before pre-flight testing was initiated.

As shown in FIG. 2, the communications interface 44 is arranged to relay user signals 54 between the non-engine electronics 28 and the set of electronic control units 48. To initiate the pre-flight test, a user (e.g., a pilot of the aircraft 26) actuates the start switch 32. In response to such actuation, the start switch 32 outputs a user signal 54 (e.g., a start signal) and the communications interface 44 relays the user signal 54 to the set of electronic control units 48. The start switch 32 can be in the form of a switch, a button, or some other trigger to indicate that the pilot wishes the pre-flight testing to occur. The communications interface 44 is further arranged to relay other user signals 54 to the set of electronic control units 48 as well such as signals 54 from the user to increase or decrease engine speed, and the like. As will be explained in further detail shortly, the communications interface 44 is arranged to convey signals outputted from the set of electronic control units 48 to various non-engine related portions of the aircraft 26.

As shown in FIG. 2, the engine subsystem interface 46 is arranged to send engine control signals 56 from the set of electronic control units 48 to the engine electronics 30. This is usually done in response to the set of electronic control units 48 receiving user signals 54. For example, after receiving the user signals 54 to conduct a pre-flight test from the start switch 32, the set of electronic control units 48 sends the engine control signals 56 to direct various aspects of engine operation.

As shown in FIG. 2, the engine subsystem interface 46 is also arranged to acquire sensor signals 58 from the engine electronics 30 and convey these sensor signals 58 to the set of electronic control units 48. For example, various sensor signals 58 from sensors distributed around and/or within the engine 22 (e.g., exhaust gas temperature sensors, engine positioning/speed sensors, deck pressure sensors, etc.) are returned to the set of electronic control units 48 across the engine subsystem interface 46. As a result, the set of electronic control units 48 is able to analyze various operating conditions of the engine 22 (e.g., to calculate current RPM of the engine 22 and determine whether the RPM increases, remains relatively constant or decreases in response to certain changes in the control scheme or device settings).

Pre-flight test results 60 can be outputted from the set of electronic control units 48 across the communications interface 44 to the non-engine electronics 28. This can be done during, as well as after, the pre-flight testing. Both the primary electronic control unit 50 and the secondary electronic control unit 52 keep track of the progress of the pre-flight test sequence and a fault is reported if the primary electronic control unit 50 and the secondary electronic control unit 52 get out of sync. The pre-flight test results 60 can be sent across the communications interface 44 to indicate the progress of the pre-flight test and indicate when a particular part of the pre-flight test 32 has passed or failed. For example, the set of test result lamps 34 gives a visual indication of the progress of the pre-flight test (e.g., by varying the blinking frequency of one or more lamps 34) and indicates when a particular part of the pre-flight test has passed or failed. The pre-flight test result 60 can be recorded in the test result storage log 36. The test result storage log 36 is preferably in the form of non-volatile memory to ensure durability of the stored information (e.g., magnetic disk storage, flash memory, etc.).

Figure 3:
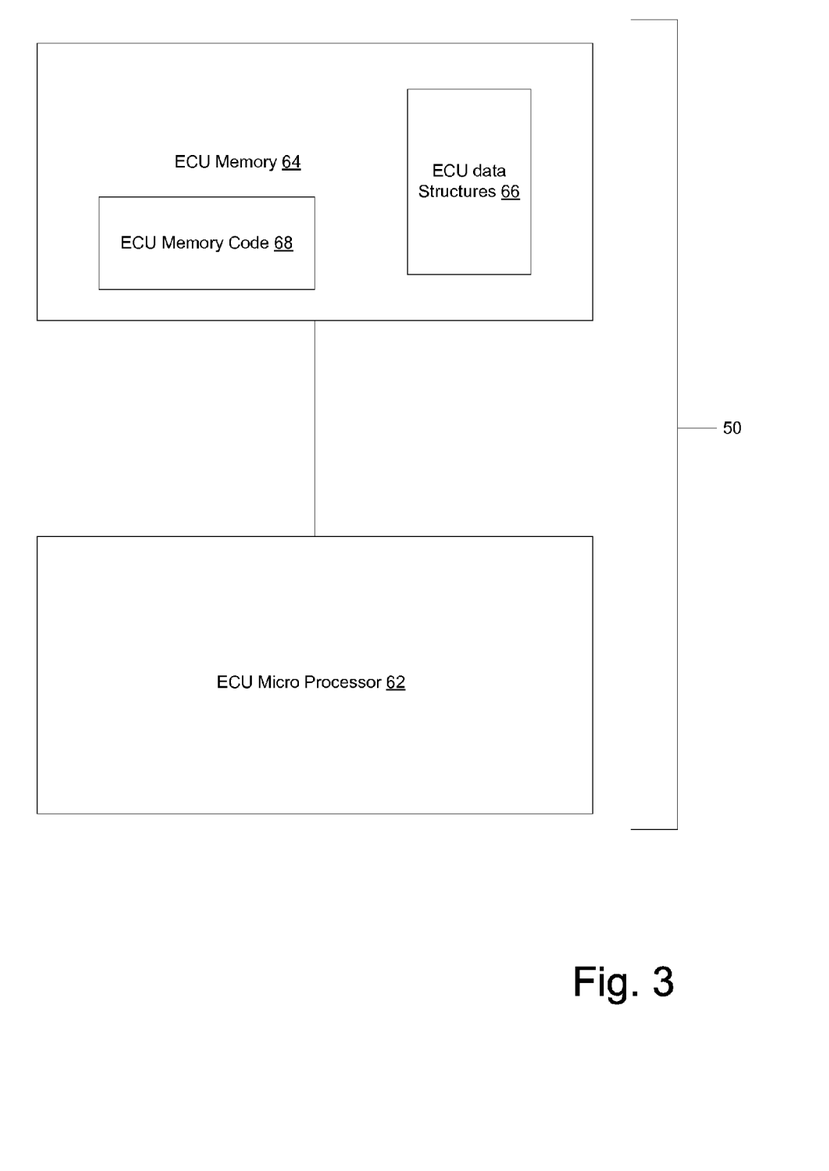
FIG. 3 is a diagram of a primary electronic control unit having an ECU microprocessor and ECU memory.

FIG. 3 shows the components of the primary electronic control unit 50 (the components for the secondary electronic control unit 52 are the same). The primary electronic control unit 50 includes an ECU microprocessor 62 and ECU memory 64. The ECU memory 64 includes a set of ECU data structures 66 and ECU memory code 68.

As shown in FIG. 3 the ECU microprocessor 62 upon initiation looks to the ECU memory 64 for instructions. The ECU memory code 68, when run by the ECU microprocessor 62, directs the ECU microprocessor 62 to instruct the engine 22 to perform various functions. The ECU memory code 68 instructs the ECU microprocessor 62 to control normal engine operations. These operations include controlling fluid pressures, controlling spark plugs, and controlling fuel injection. Prior to flight, the ECU memory code 68 can also instruct the ECU microprocessor 62 to conduct pre-flight testing. The ECU microprocessor 62 sends instructions to the engine electronics 30 by way of the engine control signals 56. After the instructions are implemented, the engine electronics return the sensor signals 58 to the ECU memory 64 and specifically to the ECU data structures 66 where the data is temporarily stored. The data is cached here until (1) it is passed on to the test result lamps 34 to give a visual representation to the pilot, and (2) it is passed onto the test result storage log 36 to keep a record of the pre-flight test results 60.

It should be understood that the secondary ECU 52 is preferably arranged and provisioned in a manner similar to that described above for the primary ECU 50 (also see FIG. 3). Accordingly, the ECUs 50, 52 preferably have full redundancy (i.e., individual processors, memory and copies of executable code) for enhanced fault tolerance.

Figure 4:
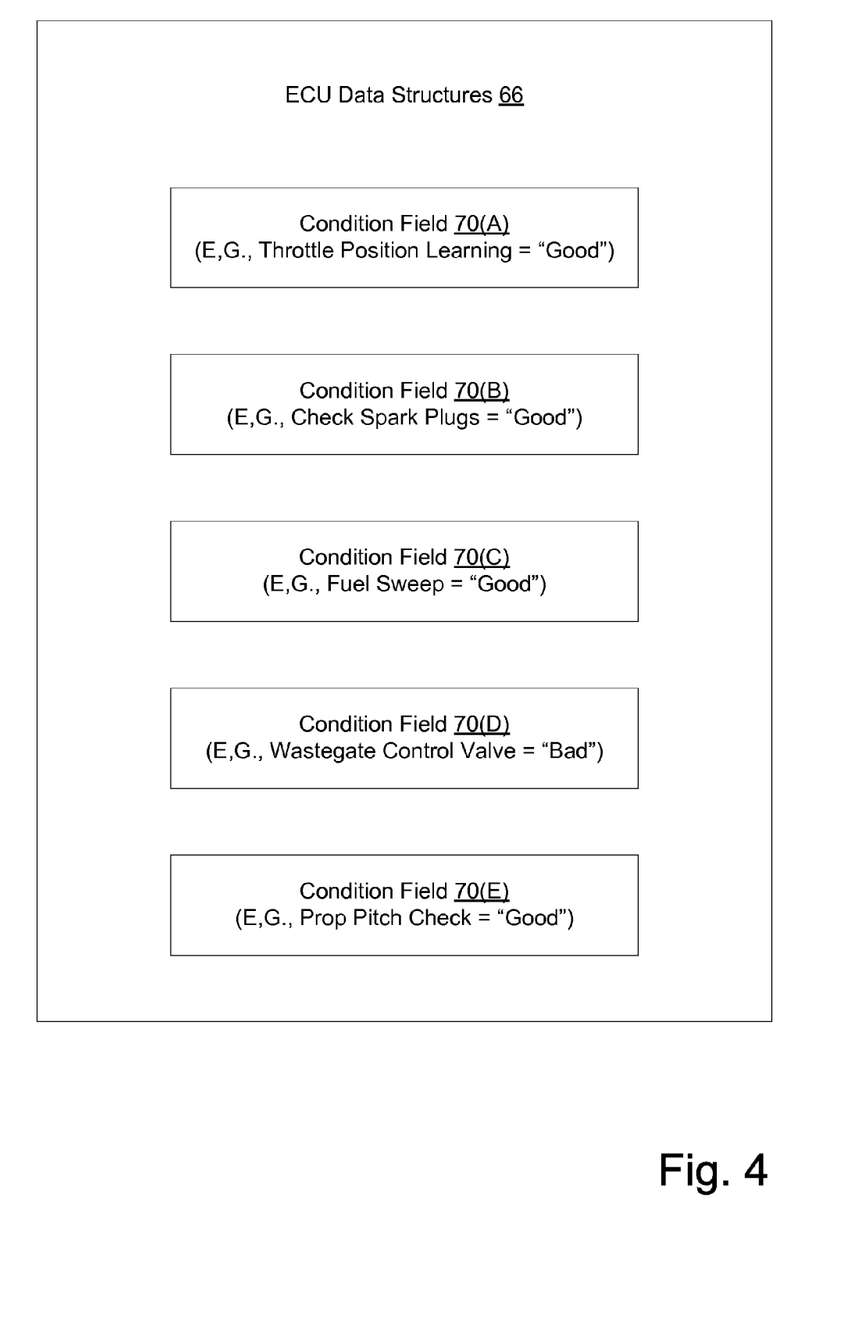
FIG. 4 is a diagram of a set of condition fields that indicate operating conditions of the engine resulting from the pre-flight test.

FIG. 4 shows a set of condition fields 70 (i.e. one or more condition fields) for various testing elements of the pre-flight test stored in the ECU data structures 66. Each of the condition fields 70 can be in a "good" condition or state (i.e., the field 70 stores a value indicating that a corresponding testing element has properly passed), or a "bad" condition or state (i.e., the field 70 stores a value indicating that the corresponding testing element has failed). As shown in FIG. 4, each of the condition fields 70 corresponds to a particular testing element performed during the pre-flight test. Examples of particular testing elements include throttle position learning, checking spark plugs, fuel sweep, wastegate control valve, prop pitch check, or any other test performed in the pre-flight testing. Depending on the success of each testing element, each particular condition field 70 registers a condition. If a testing element is passed the corresponding condition field 70 indicates the condition: good. If a testing element is failed the corresponding condition field 70 indicates the condition: bad.

If a particular testing element has failed and the corresponding condition field 70 indicates the condition: bad, the pre-flight test continues with the remaining testing elements. During the pre-flight test, the electronic aircraft control system 20 reports to the pilot (via the test result lamps 34) the various conditions of the testing elements as they are conducted. At the end of the pre-flight test, the electronic aircraft control system 20 reports to the pilot (via the test result lamps 34) the over all pre-flight test results 60 including all of the conditions for each of the testing elements. This information is also stored in the test result storage log 36.

Accordingly, after the pre-flight test is performed, each condition field 70 stores a value indicating whether an enabling condition exists or does not exist for a corresponding test element. If there is at least one absence of an enabling condition value in the set of condition fields 70, the user may abort takeoff plans and thoroughly investigate the cause of each absence.

Figure 5:
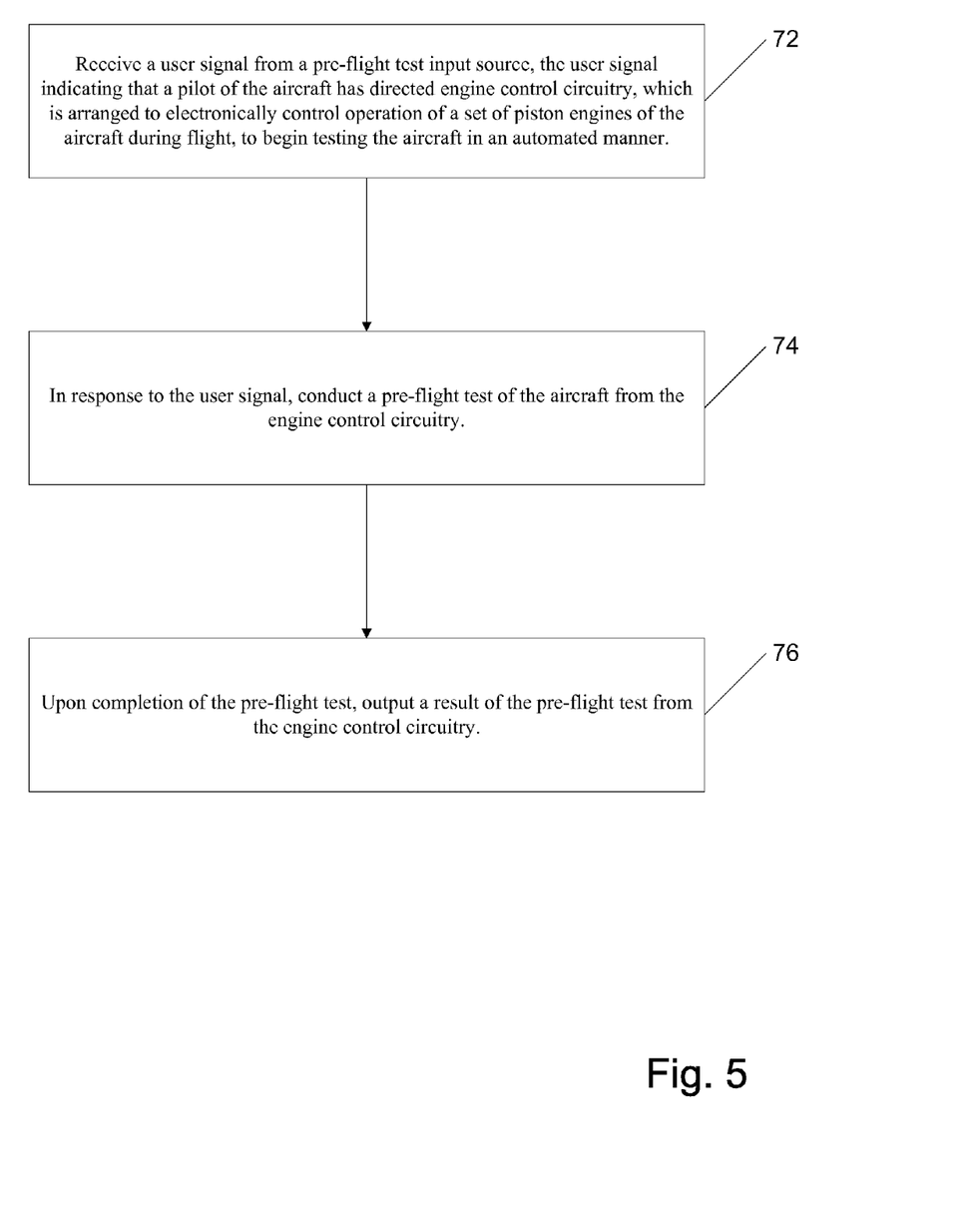
FIG. 5 is a flowchart of a procedure for conducting a pre-flight test of the piston engine aircraft.

FIG. 5 is a flowchart of a procedure which is performed by the engine control circuitry 24 (also see FIG. 1) when conducting the pre-flight test of the piston engine aircraft 26. In step 72, the engine control circuitry receives the user signal 54 from a pre-flight test input source. The user signal 54 indicates that a pilot of the piston engine aircraft 26 has directed the engine control circuitry 24, which is arranged to electronically control operation of the set of piston engines 22 of the aircraft 26 during flight, to begin testing the aircraft 26 in an automated manner.

In step 74, the engine control circuitry 24 responds to the user signal 54 by conducting a pre-flight test of the aircraft 26 from the engine control circuitry 24. As the engine control circuitry 24 performs the pre-flight test, the engine control circuitry 24 may vary the blinking frequency of one or more lamps 34 or provide other types of visual patterns to the user for enhanced feedback.

An example pre-flight test includes: (1) throttle position learning; (2) disable sparks from the secondary electronic control unit 52; (3) check engine 22 speed is as expected; (4) check exhaust gas temperatures are as expected; (5) re-enable sparks from the secondary electronic control unit 52; (6) check engine 22 speed is as expected; (7) check exhaust gas temperatures are as expected; (8) disable sparks from the primary electronic control unit 50; (9) check engine 22 speed is as expected; (10) check exhaust gas temperatures are as expected; (11) re-enable sparks from the primary electronic control unit 52; (12) check engine 22 speed is as expected; (13) check exhaust gas temperatures are as expected; (14) primary electronic control unit 50 fuel sweep, ramp fuelling to maximum rich; (15) check that the exhaust gas temperature changes accordingly; (16) ramp fuelling to maximum lean; (17) check that the exhaust gas temperature changes accordingly; (18) ramp fuelling to original set point; (19) primary electronic control unit 50 wastegate check, close the wastegate; (20) check the deck pressure changes accordingly; (21) open the wastegate; (22) check the deck pressure changes accordingly; (23) primary electronic control unit 50 prop pitch test, ramp prop pitch from low to high then back to low pitch; (24) check engine 22 speed changes accordingly; (25) switch to secondary electronic control unit 52; (26) secondary electronic control unit 52 fuel sweep, ramp fuelling to maximum rich; (27) check that the exhaust gas temperature changes accordingly; (28) ramp fuelling to maximum lean; (29) check that the exhaust gas temperature changes accordingly; (30) ramp fuelling to original set point; (31) secondary electronic control unit 52 wastegate check, close the wastegate; (32) check the deck pressure changes accordingly; (33) open the wastegate; (34) check the deck pressure changes accordingly; (35) secondary electronic control unit 52 prop pitch test, ramp prop pitch from low to high then back to low pitch; (36) check engine 22 speed changes accordingly; (37) switch back to primary electronic control unit 50; (38) check fuel pressure differential is within the expected range. This pre-flight test 32 is for exemplary purposes only and could be changed to have more, less, or different testing elements as needed.

For illustration purposes, a few testing element examples will now be provided. In connection with throttle positioning testing, the engine control circuitry 24 is capable of accessing the engine electronics 30 (FIG. 2) to confirm proper throttle operation. Along these lines it should be understood that the engine electronics 30 includes, as an engine subsystem, a throttle positioning subsystem having a base, a throttle, and an actuator which is arranged to angularly position the throttle relative to the base. The primary ECU 50 is arranged to send a first throttle positioning signal to the actuator of the throttle positioning subsystem, the first throttle positioning signal being arranged to move the throttle to a first predefined angular position relative to the base through the channel of the primary ECU 50. The primary ECU 50 is further arranged to measure whether the throttle has moved to first predefined angular position relative to the base in response to the first throttle positioning signal. Confirmation of a change in throttle position is easily obtained by verifying a change in engine speed (e.g., see the engine speed sensor 40 in FIG. 2). Similarly, the secondary ECU 52 is arranged to send a second throttle positioning signal to the actuator of the throttle positioning subsystem, the second throttle positioning signal being arranged to move the throttle to a second predefined angular position relative to the base through the channel of the secondary ECU 52. The secondary ECU 52 is further arranged to measure whether the throttle has moved to second predefined angular position relative to the base in response to the second throttle positioning signal.

As another example, it should be understood that the engine electronics 30 includes, as an engine subsystem, an engine spark subsystem having a spark plug signal source and a network of spark plug cables which is arranged to deliver spark plug signals from the spark plug signal source to the spark plugs. As part of this testing element, the primary ECU 50 is arranged to (i) direct the spark plug signal source to deliver a first set of spark plug signals to the spark plugs through the network, and (ii) confirm/measure engine combustion in response to the first set of spark plug signals through its channel. Additionally, the secondary ECU 52 is arranged to subsequently direct the spark plug signal source to deliver a second set of spark plug signals to the spark plugs through the network, and confirm/measure engine combustion in response to the second set of spark plug signals through its channel.

As yet another example, it should be understood that the engine electronics 30 includes, as an engine subsystem, an adjustable propeller subsystem having a valve which controls an oil pressure, a propeller base, fin members which extend from the propeller base and which change angular pitch relative to the propeller base in response to changes in the oil pressure. Through its respective channel, the primary ECU 50 (i) sends a first propeller pitch control signal to the valve of the throttle positioning subsystem, the first propeller pitch control signal being arranged to effectuate a change in the oil pressure to change the angular pitch of the fin members of the throttle positioning subsystem, and (ii) measures whether the fin members have changed angular pitch relative to the propeller base in response to the change in the oil pressure. One technique for confirming a change in angular pitch is to detect a change in engine RPM. Similarly, through its respective channel, the secondary ECU 52 (i) sends a second propeller pitch control signal to the valve of the throttle positioning subsystem, the second propeller pitch control signal being arranged to effectuate a change in the oil pressure to change the angular pitch of the fin members of the throttle positioning subsystem, and (ii) measures whether the fin members have changed angular pitch relative to the propeller base in response to the change in the oil pressure.

As another example, it should be understood that the engine electronics 30 includes, as an engine subsystem, a turbo charge subsystem having a pressure control valve. In this testing element, the primary ECU 50 (i) sends a first valve signal to the pressure control valve of the turbo charge subsystem, the first valve signal being arranged to move the pressure control valve (or waste gate) between opened and closed positions, and (ii) measures whether a pressure change has occurred in response to sending of the first valve signal to the pressure control valve of the turbo charge subsystem. In a similar manner, the secondary ECU 52 (i) sends a second valve signal to the pressure control valve of the turbo charge subsystem, the second valve signal also being arranged to move the pressure control valve (or waste gate) between opened and closed positions, and (ii) measures whether a pressure change has occurred in response to sending of the second valve signal to the pressure control valve of the turbo charge subsystem.

The pre-flight test described above tested various testing elements across both the primary electronic control unit 50 and the secondary electronic control unit 52. The results from both the primary electronic control unit 50 and the secondary electronic control unit 52 are compared to make sure not only that the engine 22 conditions are good, but also that both the primary electronic control unit 50 and the secondary electronic control unit 52 are functioning properly.

In step 76, the engine control circuitry 24 outputs the pre-flight test results 60 of the pre-flight test from the engine control circuitry 24. In some arrangements, the pre-flight test results 60 are outputted in a form viewable to the pilot (such as the set of test result lamps 34) and in a form for documentary purposes (such as the test result storage log 36).

While various embodiments of the invention have been particularly shown and described, it will be understood by those skilled in the art that various changes in form and details may be made therein without departing from the spirit and scope of the invention as defined by the appended claims.

For example, for piston engine planes 26 that use carburetors instead of fuel injection, engine control circuitry 24 can be installed into the plane 26. This does not provide the advantage of using existing circuitry, but the pre-flight test can be conducted in an automated manner none the less. Similarly, piston engine planes 26 that have existing engine control circuitry 24 may have additional engine control circuitry 24 installed. This new engine control circuitry 24 could be dedicated solely to conducting pre-flight tests.

The invention as previously described uses the engine control circuitry 24 to conduct the pre-flight test on piston engine 22 components. However there is no reason why the engine control circuitry 24 cannot conduct the pre-flight test on other components of the piston aircraft 26. One conventional pre-flight checklist includes setting the parking break, checking that seats are upright, checking that seat belts are fastened, checking cabin doors are closed and locked, checking that flight controls are free and correct, checking flight instruments, and checking that altimeters are set. Many of these tests can be automated and done in the pre-flight test as well.

What is claimed is:

1. A method for testing an aircraft prior to flight, the method comprising:
   receiving a user signal from a pre-flight test input source, the user signal indicating that a pilot of the aircraft has directed engine control circuitry, which is arranged to electronically control operation of a set of piston engines of the aircraft during flight, to begin testing the aircraft in an automated manner;
   in response to the user signal, conducting a pre-flight test of the aircraft from the engine control circuitry;
   upon completion of the pre-flight test, outputting a result of the pre-flight test from the engine control circuitry;
   wherein the engine control circuitry includes (i) a primary electronic control unit (ECU) which is arranged to control engine combustion during a normal flight mode of the engine control circuitry, and (ii) a secondary ECU which is arranged to control engine combustion during a backup flight mode of the engine control circuitry, the engine control circuitry transitioning from the normal flight mode to the backup flight mode in the event of a failure of the primary ECU;
   wherein the primary ECU includes a first memory device which stores a first set of instructions and a first processor; and
   wherein the secondary ECU includes a second memory device which stores a second set of instructions and a second processor.

2. A method as in claim 1 wherein conducting the pre-flight test includes:
   electronically communicating with a set of engine subsystems from the engine control circuitry; and
   wherein electronically communicating with the set of engine subsystems includes:
   conducting a first portion of the pre-flight test on the set of engine subsystems from a channel of the primary ECU, and conducting a second portion of the pre-flight test on the set of engine subsystems from a channel of the second ECU, the second portion of the pre-flight test substantially mirroring the first portion of the pre-flight test.

3. A method as in claim 2 wherein outputting the result of the pre-flight test from the engine control circuitry includes:
   automatically storing the result of the pre-flight test to a storage log residing in non-volatile memory.

4. A method as in claim 2 wherein outputting the result of the pre-flight test from the engine control circuitry includes:
   varying a blinking frequency of a set of pilot viewable lamps to provide pilot feedback regarding an amount of completeness of the pre-flight test.

5. A method as in claim 2 wherein conducting the first portion of the pre-flight test includes completely carrying out a first pre-defined sequence of testing steps regardless of whether there is a failure of any testing step of the first pre-defined sequence of testing steps; and
  wherein conducting the second portion of the pre-flight test includes completely carrying out a second pre-defined sequence of testing steps regardless of whether there is a failure of any testing step of the second pre-defined sequence of testing steps.

6. A method as in claim 2 wherein conducting the first portion of the pre-flight test includes testing the set of engine subsystems to verify existence of a set of enabling conditions from the perspective of the primary ECU; and
  wherein conducting the second portion of the pre-flight test includes testing the set of engine subsystems to verify existence of the set of enabling conditions from the perspective of the secondary ECU.

7. A method as in claim 2 wherein the set of engine subsystems includes a throttle positioning subsystem having a base, a throttle, and an actuator which is arranged to angularly position the throttle relative to the base;
  wherein conducting the first portion of the pre-flight test includes, from the channel of the primary ECU, (i) sending a first throttle positioning signal to the actuator of the throttle positioning subsystem, the first throttle positioning signal being arranged to move the throttle to a first predefined angular position relative to the base, and (ii) measuring whether the throttle has moved to the first predefined angular position relative to the base in response to the first throttle positioning signal; and
  wherein conducting the second portion of the pre-flight test includes, from the channel of the primary ECU, (i) sending a second throttle positioning signal to the actuator of the throttle positioning subsystem, the second throttle positioning signal being arranged to move the throttle to a second predefined angular position relative to the base, and (ii) measuring whether the throttle has moved to the second predefined angular position relative to the base in response to the second throttle positioning signal.

8. A method as in claim 2 wherein the set of engine subsystems includes a spark plug signal source and a network of spark plug cables which is arranged to deliver spark plug signals from the spark plug signal source to the spark plugs;
  wherein conducting the first portion of the pre-flight test includes, from the channel of the primary ECU, (i) directing the spark plug signal source to deliver a first set of spark plug signals to the spark plugs through the network, and (ii) measuring engine combustion in response to the first set of spark plug signals; and
  wherein conducting the second portion of the pre-flight test includes, from the channel of the secondary ECU, (i) directing the spark plug signal source to deliver a second set of spark plug signals to the spark plugs through the network, and (ii) measuring engine combustion in response to the second set of spark plug signals.

9. A method as in claim 2 wherein the set of engine subsystems includes an adjustable propeller subsystem having a valve which controls an oil pressure, a propeller base, fin members which extend from the propeller base and which change angular pitch relative to the propeller base in response to changes in the oil pressure;
  wherein conducting the first portion of the pre-flight test includes, from the channel of the primary ECU, (i) sending a first propeller pitch control signal to the valve of the throttle positioning subsystem, the first propeller pitch control signal being arranged to effectuate a change in the oil pressure to change the angular pitch of the fin members of the throttle positioning subsystem, and (ii) measuring whether the fin members have changed angular pitch relative to the propeller base in response to the change in the oil pressure; and
  wherein conducting the second portion of the pre-flight test includes, from the channel of the primary ECU, (i) sending a second propeller pitch control signal to the valve of the throttle positioning subsystem, the second propeller pitch control signal being arranged to effectuate a change in the oil pressure to change the angular pitch of the fin members of the throttle positioning subsystem, and (ii) measuring whether the fin members have changed angular pitch relative to the propeller base in response to the change in the oil pressure.

10. A method as in claim 2 wherein the set of engine subsystems includes a turbo charge subsystem having a pressure control valve;
  wherein conducting the first portion of the pre-flight test includes, from the channel of the primary ECU, (i) sending a first valve signal to the pressure control valve of the turbo charge subsystem, the first valve signal being arranged to move the pressure control valve between opened and closed positions, and (ii) measuring whether a pressure change has occurred in response to sending of the first valve signal to the pressure control valve of the turbo charge subsystem; and
  wherein conducting the second portion of the pre-flight test includes, from the channel of the primary ECU, (i) sending a second valve signal to the pressure control valve of the turbo charge subsystem, the second valve signal being arranged to move the pressure control valve between the opened and closed positions, and (ii) measuring whether a pressure change has occurred in response to sending of the second valve signal to the pressure control valve of the turbo charge subsystem.

11. A method as in claim 2
  wherein conducting the first portion of the pre-flight test on the set of engine subsystems from a channel of the primary ECU includes operating the first processor in accordance with the first set of instructions; and
  wherein conducting the second portion of the pre-flight test on the set of engine subsystems from a channel of the secondary ECU includes operating the second processor in accordance with the second set of instructions.

12. A method as in claim 11 wherein the first set of instructions stored in the first memory device of the primary ECU is first executable code;
  wherein the second set of instructions stored in the second memory device of the secondary ECU is second executable code;
  wherein operating the first processor in accordance with the first set of instructions includes the first processor executing the first executable code; and
  wherein operating the second processor in accordance with the second set of instructions includes the second processor executing the second executable code.

13. An electronic aircraft control system, comprising:
an engine subsystem interface;
a communications interface; and
engine control circuitry coupled to the engine subsystem interface and the communications interface, the engine control circuitry being arranged to control operation of a set of piston engines of an aircraft during flight, the engine control circuitry being further arranged to:
  receive a user signal from the communications interface, the user signal indicating that a pilot of the aircraft has directed the engine control circuitry to begin testing the aircraft in an automated manner, in response to the user signal, conduct a pre-flight test of the aircraft through the engine subsystem interface, and upon completion of the pre-flight test, output a result of the pre-flight test through the communications interface;

wherein the engine control circuitry includes (i) a primary electronic control unit (ECU) which is arranged to control engine combustion during a normal flight mode of the engine control circuitry, and (ii) a secondary ECU which is arranged to control engine combustion during a backup flight mode of the engine control circuitry, the engine control circuitry transitioning from the normal flight mode to the backup flight mode in the event of a failure of the primary ECU;

wherein the primary ECU includes a first memory device which stores a first set of instructions and a first processor; and wherein the secondary ECU includes a second memory device which stores a second set of instructions and a second processor.

14. An electronic aircraft control system as in claim 13 wherein the engine control circuitry, when conducting the pre-flight test, is arranged to electronically communicate with a set of engine subsystems; and wherein the electronic control circuitry, when electronically communicating with the set of engine subsystems, is arranged to (i) conduct a first portion of the pre-flight test on the set of engine subsystems from a channel of the primary ECU, and (ii) conduct a second portion of the pre-flight test on the set of engine subsystems from a channel of the second ECU, the second portion of the pre-flight test substantially mirroring the first portion of the pre-flight test.

15. An electronic aircraft control system as in claim 14 wherein the electronic control circuitry, when outputting the result of the pre-flight test, is arranged to:

automatically store the result of the pre-flight test to a storage log residing in non-volatile memory through the communications interface.

16. An electronic aircraft control system as in claim 14 wherein the electronic control circuitry, when outputting the result of the pre-flight test, is arranged to:

vary a blinking frequency of a set of pilot viewable lamps through the communications interface to provide pilot feedback regarding an amount of completeness of the pre-flight test.

17. An electronic aircraft control system as in claim 14 wherein the electronic control circuitry, when conducting the first portion of the pre-flight test, is arranged to completely carry out a first pre-defined sequence of testing steps regardless of whether there is a failure of any testing step of the first pre-defined sequence of testing steps; and wherein the electronic control circuitry, when conducting the second portion of the pre-flight test, is arranged to completely carry out a second pre-defined sequence of testing steps regardless of whether there is a failure of any testing step of the second pre-defined sequence of testing steps.

18. An electronic aircraft control system as in claim 14 wherein the electronic control circuitry, when conducting the first portion of the pre-flight test, is arranged to test the set of engine subsystems to verify existence of a set of enabling conditions from the perspective of the primary ECU; and wherein the electronic control circuitry, when conducting the second portion of the pre-flight test, is arranged to test the set of engine subsystems to verify existence of the set of enabling conditions from the perspective of the secondary ECU.

19. A method as in claim 2, wherein outputting the result of the pre-flight test from the engine control circuitry includes:

varying, as the pre-flight test is conducted, a blinking frequency of a set of pilot viewable lamps to provide pilot feedback regarding various conditions of testing elements of the pre-flight test;

varying, at the end of the pre-flight test, the blinking frequency of the set of pilot viewable lamps to provide pilot feedback regarding overall conditions of the testing elements of the pre-flight test; and automatically storing the pilot feedback regarding overall conditions of the testing elements of the pre-flight test to a storage log residing in non-volatile memory;

wherein conducting the first portion of the pre-flight test includes completely carrying out a first pre-defined sequence of testing steps regardless of whether there is a failure of any testing step of the first pre-defined sequence of testing steps; and wherein conducting the second portion of the pre-flight test includes completely carrying out a second pre-defined sequence of testing steps regardless of whether there is a failure of any testing step of the second pre-defined sequence of testing steps.

20. A method as in claim 2, wherein conducting the pre-flight test of the aircraft from the engine control circuitry includes:

learning a throttle position;
after disabling sparks from the primary ECU and the secondary ECU:
checking engine speed;
checking exhaust gas temperatures;
after re-enabling sparks from the primary ECU and the secondary ECU:
checking engine speed;
checking exhaust gas temperatures;
performing a primary ECU fuel sweep;
performing a primary ECU wastegate check;
performing a primary ECU prop pitch check;
switching to the secondary ECU from the primary ECU;
performing a secondary ECU fuel sweep;
performing a secondary ECU wastegate check;
performing a secondary ECU prop pitch check;
switching to the primary ECU from the secondary ECU;
checking fuel pressure differential; and
performing a test of aircraft cabin elements, including:
setting a parking brake;
checking seat positions;
checking seatbelts;
checking cabin door position;
checking cabin door locks;
checking flight controls;
checking flight instruments; and
checking altimeters.

* * * * *